Feb. 3, 1959 J. G. TELEKY 2,872,122
FLOATING ROLL MILL WITH TWO POINT DIRECT
HYDRAULIC PRESSURE CONTROL
Filed Dec. 21, 1954 8 Sheets-Sheet 2
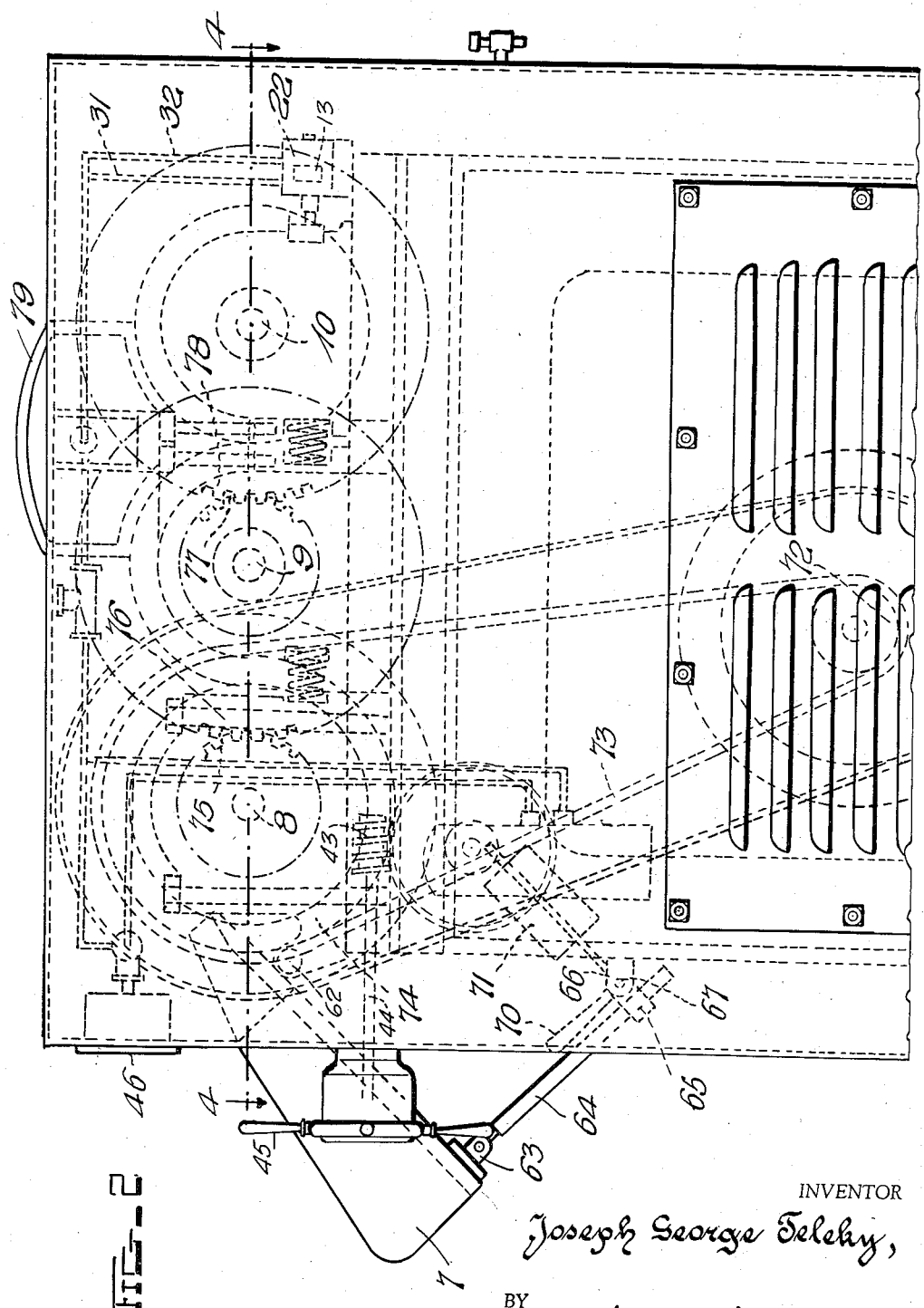
INVENTOR
Joseph George Teleky,
BY
John B. Brady
ATTORNEY

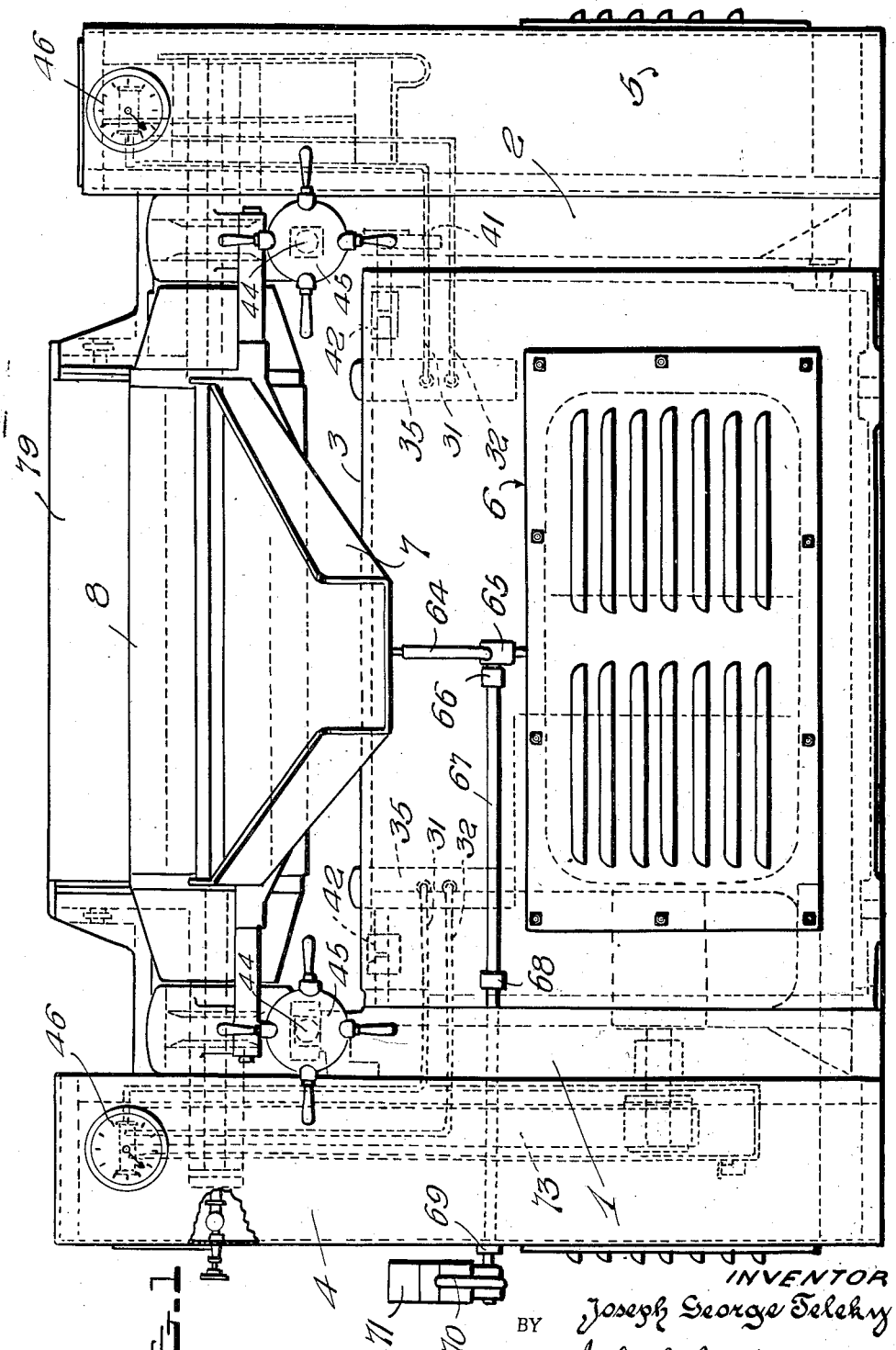

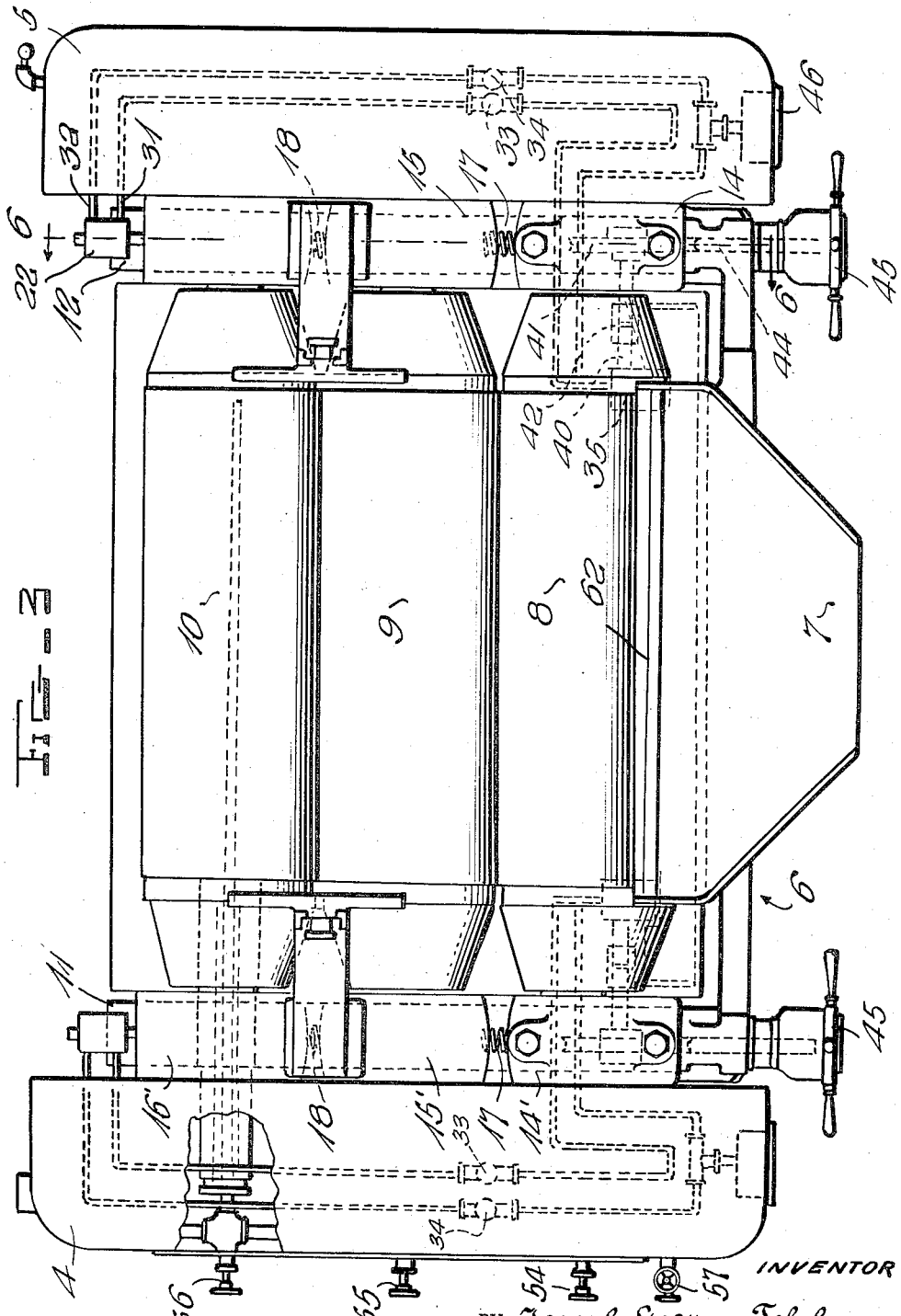

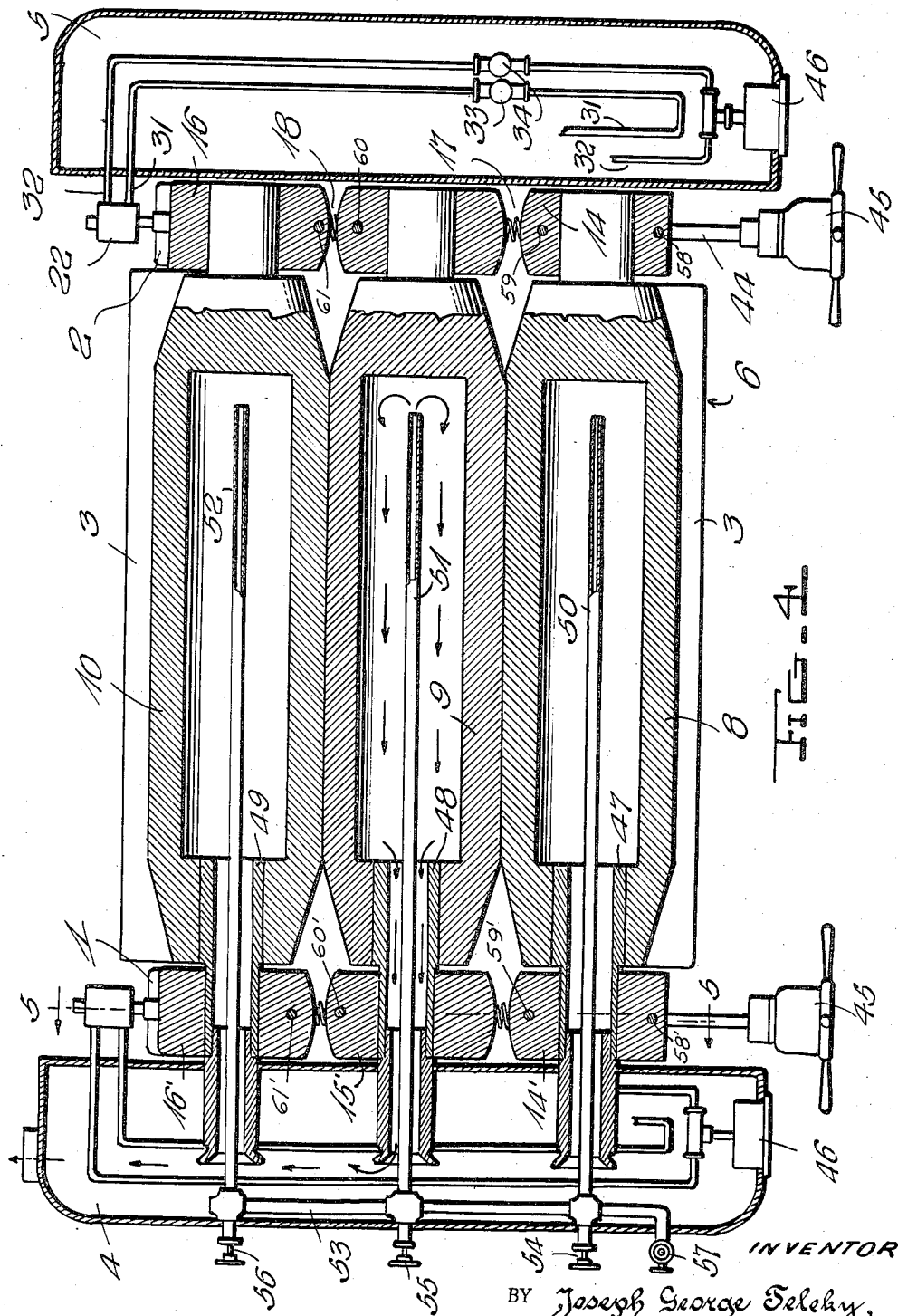

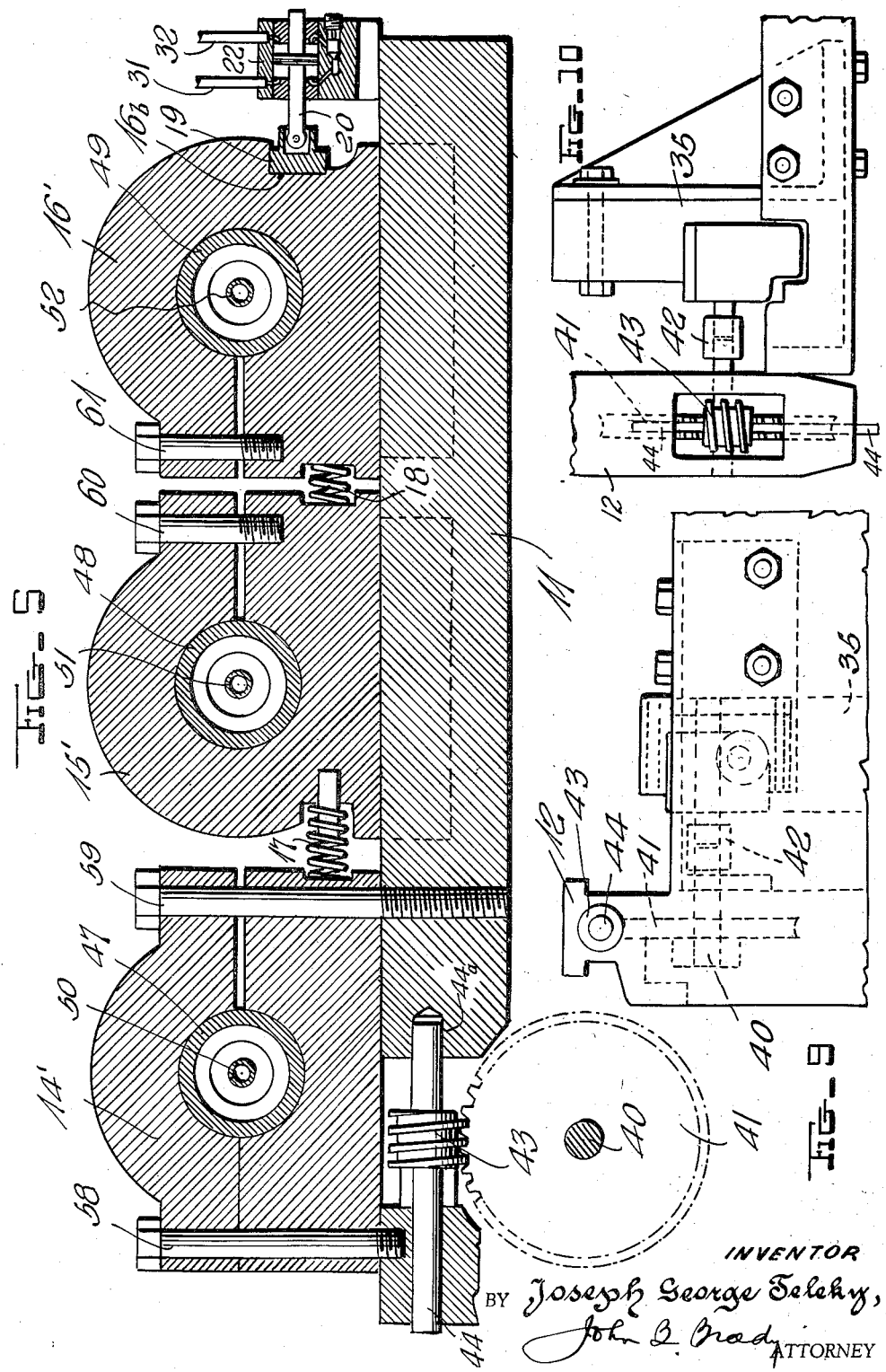

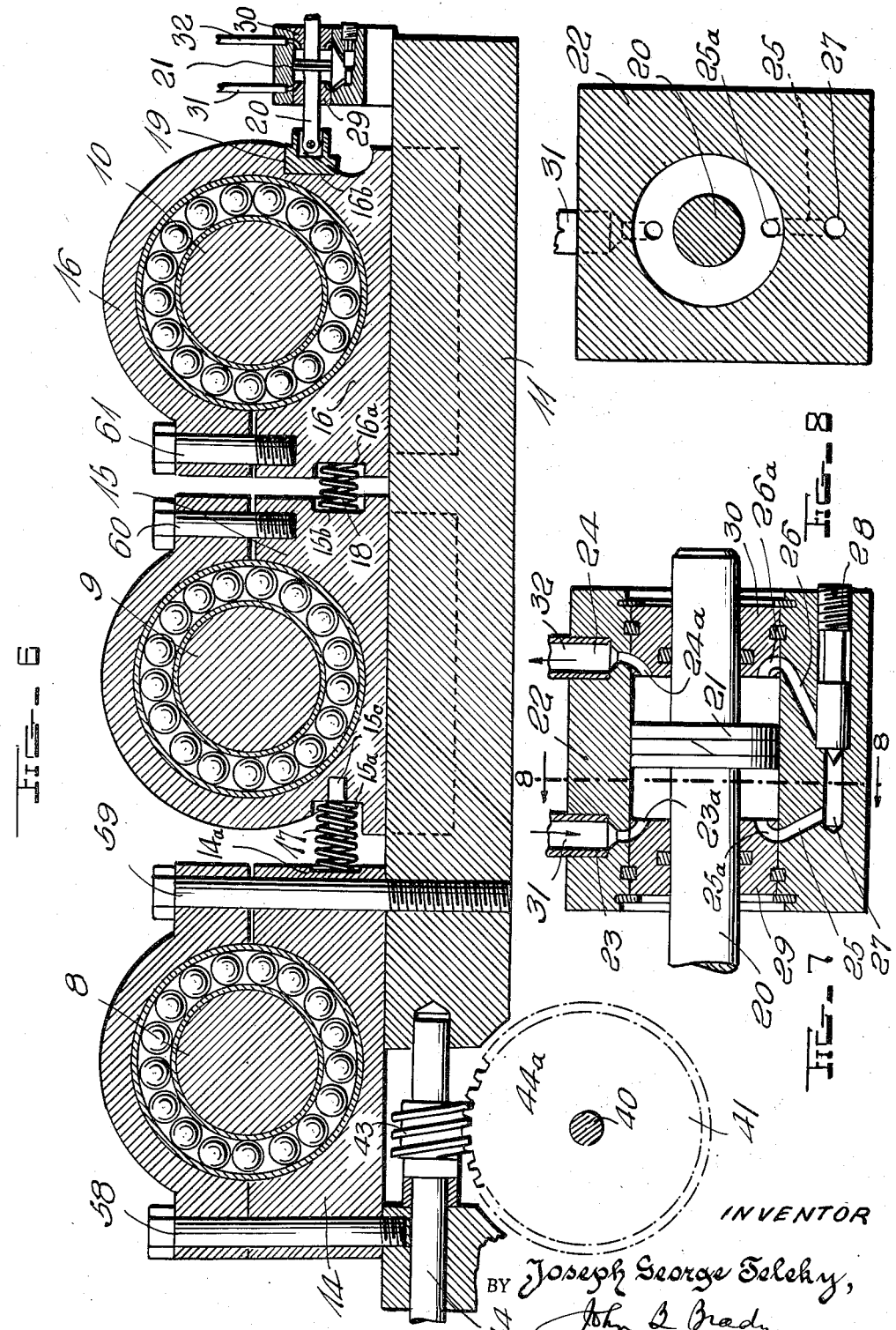

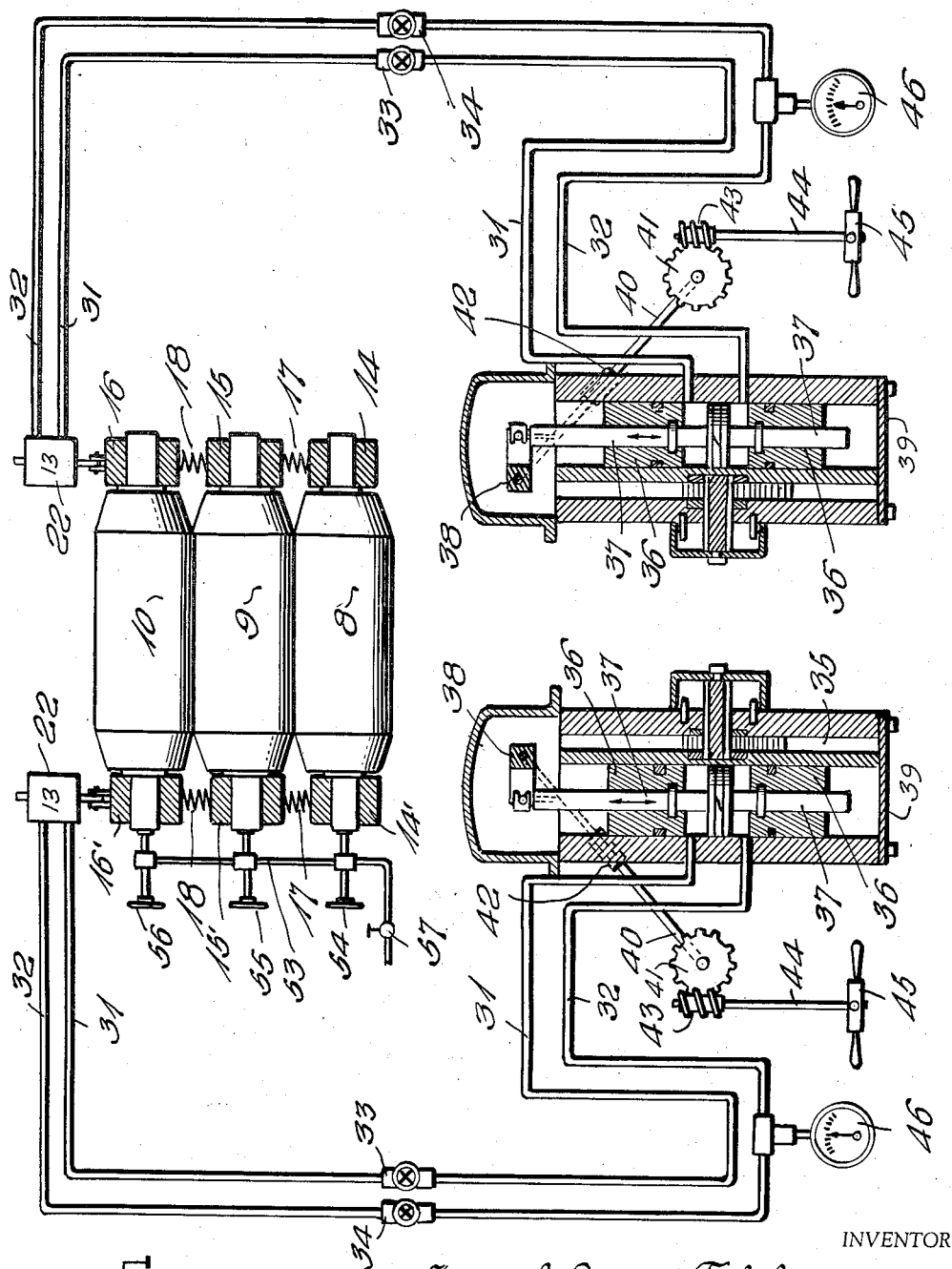

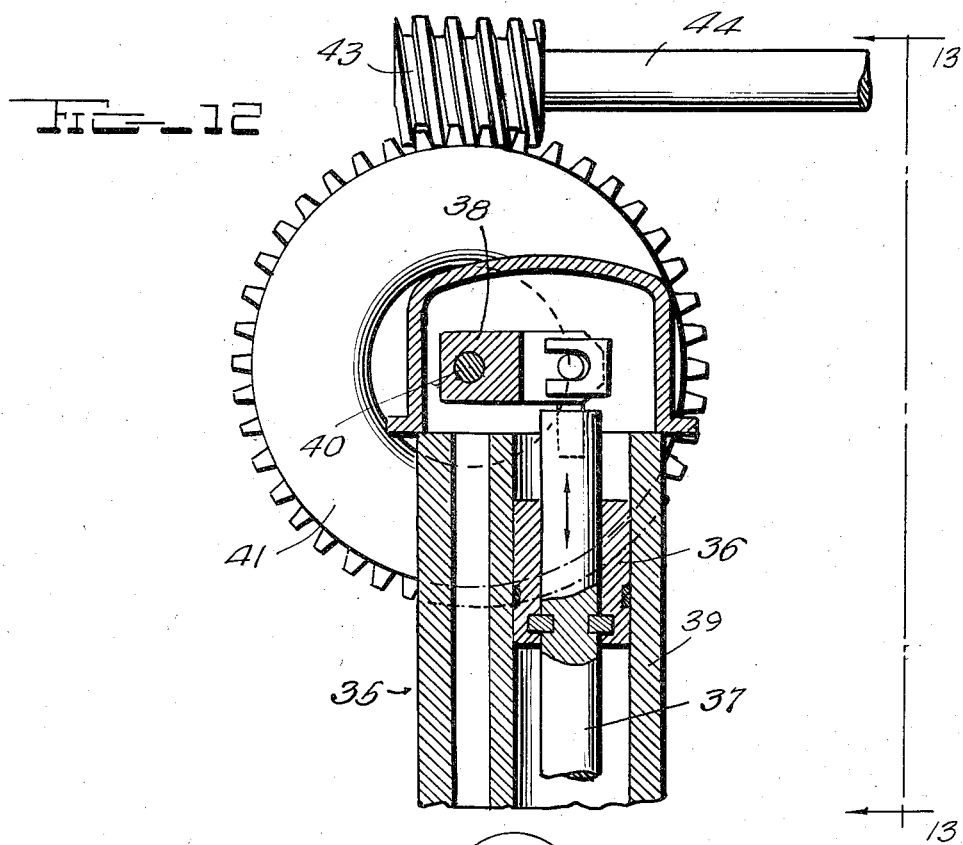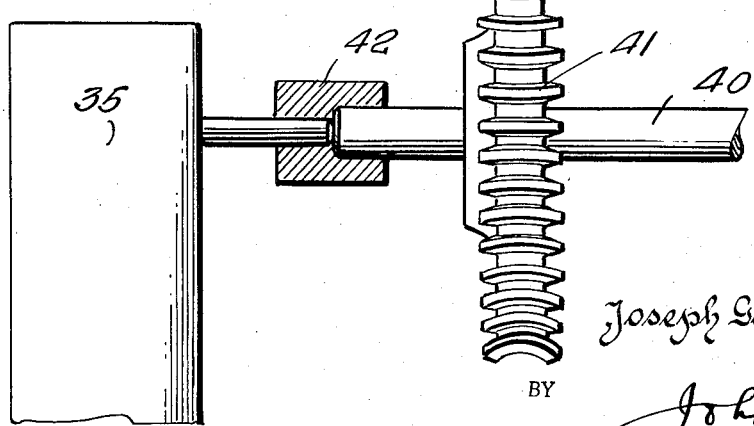

United States Patent Office 2,872,122
Patented Feb. 3, 1959

2,872,122

FLOATING ROLL MILL WITH TWO POINT DIRECT HYDRAULIC PRESSURE CONTROL

Joseph George Teleky, New York, N. Y., assignor to Charles Ross & Son Company, Brooklyn, N. Y., a corporation of New York Application December 21, 1954, Serial No. 476,668

6 Claims. (Cl. 241—111)

My invention relates broadly to mills for comminuting pigments and the like and more particularly to a construction of floating roll mill and hydraulic means for adjusting the relationship of the coacting rolls in the mill.

One of the objects of my invention is to provide an improved construction of floating roll mill including hydraulic means for adjusting the operating pressure between the rolls.

Another object of my invention is to provide an improved construction of floating roll mill in which precision pressure adjustments may be applied to opposite ends of the rolls for controlling the coacting relationship of the rolls for comminuting pigments and the like.

Still another object of my invention is to provide a construction of floating roll mill having direct hydraulic pressure force applications applied at two points for controlling the pressure between the coacting rolls.

Still another object of my invention is to provide an arrangement of pressure gage control for adjusting the pressure at opposite ends of the rolls and matching the applied pressures by symmetrical readings on the gages whereby uniform pressures may be maintained throughout the length of the coacting rolls.

Still another object of my invention is to provide a floating roll mill having two point direct hydraulic pressure control where all adjustments are made from the front of the mill and where there is no necessity for the operator to move to the rear of the mill, thereby facilitating installation and maintenance operations.

A still further object of my invention is to provide an arrangement of floating roll mill equipped with hydraulic pressure applicators at opposite ends of the rolls with associated pressure gages by which the surface pressure between the rolls may be pre-set in accordance with specifications accompanying paint, pigments, ink and the like formulas, so that correct hydraulic pressure may be exerted between the rolls for producing the required comminution of the material being treated as per specification.

Other and further objects of my invention reside in an improved assembly for a floating roll mill having two point direct hydraulic pressure control for symmetrically distributing the load between the contacting surfaces of the rolls as set forth more fully in the specification hereinafter following by reference to the accompanying drawings, in which:

Fig. 1 is a front view of the floating roll mill with two point direct hydraulic pressure control in accordance with my invention;

Fig. 2 is a fragmentary side elevational view of the floating roll mill embodying my invention, with certain parts illustrated in dotted lines to show the manner of yieldingly separating the rolls prior to application of hydraulic pressure thereto;

Fig. 3 is a top plan view of the floating roll mill of my invention with a portion of the casing at the left broken away to illustrate the interior arrangement;

Fig. 4 is a horizontal sectional view taken substantially on line 4—4 of Fig. 2 with certain parts shown in elevation;

Fig. 5 is a cross sectional view taken substantially on line 5—5 of Fig. 4, but drawn to an enlarged scale to more clearly illustrate the relationship of the rolls;

Fig. 6 is a cross sectional view taken substantially on line 6—6 of Fig. 3 and illustrating particularly the anti-friction bearings in which the rolls are journaled;

Fig. 7 is a cross sectional view through the hydraulic unit by which pressure is applied to the rolls;

Fig. 8 is a transverse sectional view through the hydraulic unit taken substantially on line 8—8 of Fig. 7;

Fig. 9 is a detailed fragmentary view illustrating the adjustable means for operating the hydraulic control mechanism;

Fig. 10 is a fragmentary plan view showing the adjustable control mechanism of Fig. 9;

Fig. 11 is a schematic diagram illustrating the manner of applying hydraulic pressures symmetrically to opposite ends of the rolls for applying the required pressures between the coacting rolls to meet certain prescribed comminuting conditions according to specifications of the material being treated;

Fig. 12 is a fragmentary sectional view, similar to the view shown in Fig. 11, on an enlarged scale, showing the manner of controlling the master unit illustrated in Fig. 11; and Fig. 13 shows the connection to the master unit looking in the direction of line 13—13 of Fig. 12.

My invention is directed to a floating roll mill with two point direct hydraulic pressure control by which, in a multiple roll mill, a pressure setting may effected, insuring the operation of the rolls in surface contact with each other at a precise pressure. The pressure adjustment may be changed and reset from time to time for repeating operation under certain pressure specifications to meet the requirements of certain pigments in vehicles which require comminutation according to certain prescribed specifications. I arrange a front roll on a frame structure for rotative movement in a fixed position and then slidably mount a floating roll adjacent the front roll for adjustment toward and away from the front roll. I then slidably mount on the frame structure a rear roll in a position slidable toward and away from the floating center roll. Hydraulic pressure is then applied adjacent the ends of the rear roll for adjusting the rear roll toward the floating roll and correspondingly move the floating roll toward the fixed roll. The pair of rolls is adjusted toward the front fixed roll and the pressure of such adjustment may be selected with a high degree of precision meeting the most exacting requirements of pigments and vehicles with respect to their particular comminutation specifications. The hydraulic pressure is applied through a closed conduit system which includes a hydraulic pressure adjusting control member and a pressure gage.

A pressure control system of this type is arranged adjacent each end of the roll system and the pressure gages are located at each side of the mill adjacent the control member so that the exact pressure applied to the multiple rolls may be observed on the pressure gages. The control members are manipulated at each side of the front of the mill until the pressure gages are equalized thereby indicating the symmetrical pressure conditions under which the rolls are operating. I provide gear means for positively driving all of the rolls. The pressure adjustment may be effected while the rolls are in operation.

The improved mill of my invention has the advantages of automatic alignment of the rolls; simplicity of operation; the application of hydraulic pressure at such positions that the number of misalignments are minimized;

cleaning of the rolls is made easy by reason of the improved assembly of my invention; all adjustments are made from the front of the mill by maintaining the two gages at opposite sides of the mill equal so that there is no reason for the operator to normally have to move to the rear of the mill; considerable strength is obtained in the structure of the mill by reason of the arrangement of the rolls; and, pressures between the rolls may be changed according to the recorded pressure conditions on paint formulas, for example, for securing the most efficient comminutation for the pigments and the vehicles in the material being treated.

Referring to the drawings in more detail, reference character 1 designates a standard at one side of the frame of the mill for supporting the rolls, and reference character 2 designates a corresponding standard associated with the frame at the other side of the mill. Between standards 1 and 2 there is an intermediate bed 3 on opposite sides of which I provide the side covers 4 and 5 constituting part of the frame of the mill. There is a front cover for the frame of the mill designated at 6 beyond which the apron 7 extends from the front of the mill for guiding the discharge of the comminuted paint or other material from the mill. On top of the mill I journal the front roll 8, the floating center roll 9 and the adjustable rear roll 10. The standards 1 and 2 support T-slide frames 11 and 12 which serve as mounting means for the fixed bearings 14 for the front roll 8, and for the slide bearings 15 for the floating roll 9 and for the slide bearings 16 for the rear roll 10. The movable slide bearings 15 are separated from the fixed slide bearings 14 by compression coil springs 17. The slidable slide bearings 15 are separated from the slidable slide bearings 16 by means of compression coil springs 18. The compression coil springs 17 and 18 are housed within recesses 14a in slide bearings 14 and recesses 15a in slide bearings 15 as shown in Fig. 6. Pintles 15c are provided centrally of recesses 15a for maintaining coil springs 17 in axial alignment but the extent of projection of the pintles is limited so that the ends of the pintles do not strike the bases of recesses 14a and slide bearings 15 are always cushioned with respect to slide bearings 14. That is to say, the coil springs 17 continue to cushion the slide bearings 14 and 15 throughout the active resiliency of the coil springs 17. The pintles 15c have a length less than the length of the coil springs when fully compressed between the slide bearings 14 and 15.

The opposite limitations of slide bearings 15 are provided with recesses 15b for receiving the compression coil springs 18 which are aligned in recesses 16a of the slide bearings 16. The opposite limitations of slide bearing 16 include recesses 16b into which the plungers 19 extend. The plungers 19 are connected through pivoted links 20 with the piston 21 of the slave unit 13 containing hydraulic cylinder 22 in which piston 21 operates. The cylinder 22 is shown more clearly in Figs. 7 and 8 as including pressure intake and exhaust connections 23 and 24 and additional intake and outlet ports 25 and 26 on opposite sides of the cylinder. A fluid supply port 27 connects with intake and outlet ports 25 and 26 and is closed by a screw-threaded plug 28 arranged in the wall of cylinder 22. The cylinder 22 is provided with pressure-sealed end plates 29 and 30 containing ports 23a and 24a leading to the pressure intake and exhaust connections 23 and 24, and also ports 25a and 26a leading to the additional ported intake and outlet connections 25 and 26.

Pressure supply pipes 31 and 32 connect with the pressure intake and exhaust connections 23 and 24 as shown more clearly in Fig. 11. Pressure supply pipes 31 and 32 extend from the rearwardly located slave unit 13 forwardly of the mill interiorly of side cover 5 and include bleeder fitting and valves 33 and 34. The pipes 31 and 32 extend to the master unit shown at 35 mounted adjacent the front of the frame of the mill and shown more clearly in Fig. 11. The master unit includes a piston 36 carried by a piston rod 37 and displaceable vertically within the cylinder 39 pivoted by means of a lever 38 engaging the end of piston rod 37.

Pivoted lever 38 connects to shaft 40 which carries worm wheel 41 through the coupling 42. Worm wheel 41 is meshed with worm 43 carried by the adjusting shaft 44 which extends to the front of the mill. Adjusting shaft 44 extends into a socket bearing 44a in the end of the T-slide frame 12 carried by the top of the side standard 2. Adjusting shaft 44 is manipulated by hand wheel 45 for revolving the shaft 40 and correspondingly controlling the position of piston 36 in the cylinder 39. A pressure gage 46 is connected in series with pipe 32, as shown more clearly in Figs. 3, 4 and 11 and is arranged in the front of the mill in the side cover 5 adjacent the hand wheel 45 so that the pressure reading may be observed as the hand wheel is manipulated.

Throughout this description I have described but one side of the mill for the reason that the opposite side is identical in construction and arrangement so that I have represented corresponding parts of the pressure adjustment system by corresponding reference characters.

The rolls 8, 9, and 10 differ in construction at their opposite ends inasmuch as the rolls are water-cooled and provision must be made for the entry and discharge of the cooling fluid. As represented more clearly in Fig. 4, the hollow rolls 8, 9 and 10 are each journaled at their left hand ends by means of hollow tubular members 47, 48 and 49 which extend through the fluid bearings designated at 14', 15' and 16' in suitable anti-friction bearings, not shown. Through each of the tubular journals 47, 48 and 49 there extends a water supply pipe indicated at 50, 51 and 52, respectively, connected through a common supply pipe 53 and separate control valves 54, 55 and 56 to a main valve 57 leading to the main water supply. The cooling fluid is introduced into the hollow interior of rolls 8, 9 and 10 and chills the hollow interior of the rolls and is then discharged through the open left hand ends of the hollow tubular journals 47, 48 and 49 to a trough not shown which carries away the water to a water drain.

The front roll 8 is fixed in the front bearings 14 by means of screw members 58 and 59 which pass through the front bearings 14 and are engaged in the respective T-slide frames 11 and 12 over standards 1 and 2. As shown in Fig. 6, securing means 58 and 59 extend into T-slide frame 12. The structure at the opposite end is symmetrical. The floating roll 9 journaled in slide bearings 15 is maintained in the bearings by fastening screws 60. Similarly, the rear roll 10 is secured in slide bearings 16 by means of fastening screws 61.

The apron 7 for discharging the comminuted paint and the like is pivotally mounted with respect to the frame of the mill at 62 as shown in Figs. 1–3. A pivot connection is provided between apron 7 at 63 to which a link 64 is pivotally connected. The lower end of link 64 is adjustably supported in arm 65 which connects with the end of horizontally extending shaft 67 pivotally supported at the front of the mill as indicated at 66 and shown more clearly in Figs. 1 and 2. The horizontally extending shaft 67 is also pivotally mounted at 68 and 69 along the front of the mill and extending through the side cover 4. A handle 70 is provided on shaft 67 for angularly adjusting shaft 67. A counter-weight 71 is connected with shaft 67 for maintaining apron 7 in any selected position to which it is moved.

The mill is driven by an electric motor which may, for example, in a 3-roller 9" x 24" mill, have a capacity of 10 H. P. at 1160 R. P. M. As represented more clearly in Fig. 2 the motor 72 is connected through a chain drive 73 with the sprocket 74 connected with the shaft of the front roll 8. Front roll 8 is provided with a gear which in the example referred to is an 18-toothed gear indicated at 75 which meshes with a 54-toothed gear 76, carried by the shaft of center floating roll 9. An 18-toothed gear 77 carried on the shaft of floating center roll 9 meshes with 54-toothed gear 78 on the shaft of rear roll 10 for driving the rolls at proper comminuting speeds for securing maximum efficiency in the treatment of the paints and pigments and the like which are fed to the rolls through the trough 79, represented in Figs. 1 and 2.

In the comminution of paints and pigments according to certain specifications, the operator adjusts both of the hand wheels 45 at opposite sides of the front of the machine until the same pressure between the rolls is indicated on each of the pressure gages 46. This pressure may be established, changed, and re-established in accordance with conditions which must be kept in comminuting certain paints, pigments and inks according to specification. The pressure settings are very accurate.

While I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A mill for grinding and dispersing paint and the like comprising a frame structure, means for journaling a front roll in fixed relation to said frame structure, a floating center roll, means for journaling said floating center roll on said frame structure adjacent said front roll and slidable toward and away from said front roll, a rear roll, means for journaling said rear roll on said frame structure and slidable toward and away from said floating center roll, means disposed between said means in positions below the horizontal plane of the axes of said rolls for yieldably separating said rolls, and hydraulic means for applying forces adjacent opposite ends of said rear roll for forcing said rear roll into contact with said floating center roll and imparting corresponding movement of said floating center roll toward said front roll for comminuting paint and the like deposited in the nips of the rolls and in which said hydraulic means include for each end of said rolls a master control unit, a pressure adjusting means connected with said master control unit, a slave unit operated by said master control unit for imparting compression forces to the end of said rear roll, and a pressure gage interconnected between said master unit and said slave unit for indicating the pressure applied to the end of said rear roll.

2. In a roll mill for comminuting paint and the like, a frame structure, a pair of end cover members on said frame structure, means for journaling a front roll, a floating roll, and a rear roll on said frame structure, means for supporting the aforesaid means in slidable relation whereby the pressure between coacting surfaces at the nips of said rolls may be adjusted, a hydraulic master control unit mounted at each side of said frame structure, pressure distribution lines extending from each of said master control units through said end cover members to the rear of said frame structure, a slave unit connected with the pressure distribution lines at each side of the rear of said frame structure, said slave units including means for applying pressure to opposite ends of said rear roll, and means connected with said pressure distribution lines for regulating the pressure transmitted to said slave units from said master units for correspondingly controlling the pressure between said rolls.

3. In a roll mill for comminuting paint and the like as set forth in claim 2, a pair of pressure gages mounted at the front of opposite sides of said mill, one of said pressure gages being connected in the pressure distribution lines at one side of said mill and the other of said pressure gages being connected in the pressure distribution lines at the other side of said mill.

4. In a roll mill for comminuting paint and the like as set forth in claim 2, in which the means connected with said pressure distribution lines for regulating the pressure transmitted to said slave units in said master units consists of a hand wheel journaled at each side of said mill and connected through a gear and lever mechanism with the associated master unit for variably controlling the said master unit and correspondingly controlling the associated slave unit.

5. In a roll mill for comminuting paint and the like as set forth in claim 2, in which said means for supporting the means for journaling said rolls in slidable relation consist of rails at each side of said mill, said rails terminating at their ends in sockets, and wherein the means for regulating the pressure transmitted through said pressure distribution lines includes a rotatable shaft journaled in the socket in said rail, a hand wheel for rotating said shaft and a connection from said shaft to said master unit for variably controlling the master unit.

6. In a roll mill for comminuting paint and the like as set forth in claim 1 wherein said pressure distribution lines each includes a bleeder fitting and valves located within said end covers, said bleeder fitting and valves being operative to admit pressure fluid in each of said pressure distribution lines.

References Cited in the file of this patent

UNITED STATES PATENTS

| 240,282 | Stevens | Apr. 19, 1881 |
| 1,699,641 | Vasel | Jan. 22, 1929 |
| 2,254,512 | Brasington | Sept. 2, 1941 |
| 2,592,048 | Linden | Apr. 8, 1952 |
| 2,610,801 | Miller | Sept. 16, 1952 |
| 2,794,603 | Peters | June 4, 1957 |

FOREIGN PATENTS

| 410,967 | Great Britain | May 31, 1934 |
| 909,145 | France | Nov. 26, 1945 |